United States Patent [19]

Lewis, Jr. et al.

[11] 4,447,826
[45] May 8, 1984

[54] DIGITAL TELEVISION RECEIVER AUTOMATIC CHROMA CONTROL SYSTEM

[75] Inventors: Henry G. Lewis, Jr., Hamilton Square, N.J.; Steven M. Eliscu, Troy, N.Y.

[73] Assignee: RCA Corporation, New York, N.Y.

[21] Appl. No.: 359,433

[22] Filed: Mar. 18, 1982

[51] Int. Cl.$^3$ .......................................... H04N 9/535
[52] U.S. Cl. .................................................... 358/27
[58] Field of Search ................... 358/27, 40, 174, 169, 358/184; 364/736, 757

[56] References Cited

U.S. PATENT DOCUMENTS

| 3,740,462 | 6/1973 | Harwood | 178/514 AC |
| 3,943,560 | 3/1976 | Freestone | 358/27 |
| 4,004,140 | 1/1977 | Izumi et al. | 235/152 |
| 4,021,652 | 3/1977 | Munter | 235/152 |
| 4,191,995 | 3/1980 | Farrows | 364/113 |
| 4,240,106 | 12/1980 | Michael et al. | 358/36 |
| 4,240,113 | 12/1980 | Michael et al. | 358/180 |
| 4,396,938 | 8/1983 | Dischert | 358/21 R |

FOREIGN PATENT DOCUMENTS

| 1490531 | 11/1977 | United Kingdom . |
| 1490445 | 11/1977 | United Kingdom . |
| 1510907 | 5/1978 | United Kingdom . |
| 1510066 | 5/1978 | United Kingdom . |
| 1527797 | 10/1978 | United Kingdom . |
| 2035732A | 6/1980 | United Kingdom . |
| 2042294A | 9/1980 | United Kingdom . |
| 2052898A | 1/1981 | United Kingdom . |
| 2064242A | 6/1981 | United Kingdom . |

OTHER PUBLICATIONS

Weltersbach, J., et al., "Digitale Videosignalverarbeitung in Farbfernsehempfanger", *Fernseh und Kinotechnik*, 35, Jahrang Nr. 9/1981, Sep. 1981, pp. 317-323, (with translation).

Fischer, T., "Fernsehen Wird Digital", *Elektronik*, 16/1981, Aug. 14, 1981, pp. 27-35, (with partial translation).

*Primary Examiner*—John C. Martin
*Assistant Examiner*—Michael D. Parker
*Attorney, Agent, or Firm*—E. M. Whitacre; P. J. Rasmussen; C. A. Berard, Jr.

[57] ABSTRACT

The gain of the chroma signal in a digital television receiver is controlled in accordance with the value of a composite gain factor which is an accumulation of gain control factors provided by a user color control, automatic chroma control, and chroma overload. Gain control according to the composite gain factor is realized by a coarse gain block, which increments or decrements the chroma signal gain in increments of six dB, and a fine gain control over a range of six dB or less, in finely controlled increments. In a preferred embodiment, the digital chroma gain system is operated under control of a microprocessor, which receives signals representative of chroma overload, user control settings, and chroma burst amplitude. The microprocessor then calculates the composite chroma signal gain and apportions the gain between the coarse and fine gain control blocks. In the preferred embodiment of the invention, the coarse gain block comprises controlled shift registers for controlling the chroma signal gain over a range of 18 dB in 6 dB increments. The fine gain block comprises an adder and a random access memory (RAM), addressed by the chroma signal, which contains a data table computed by the microprocessor.

15 Claims, 10 Drawing Figures

DIGITAL TELEVISION RECEIVER AUTOMATIC CHROMA CONTROL SYSTEM

This invention relates to digital television receivers and, in particular, to an arrangement for automatically controlling the chroma signal level in a digital television receiver.

In a typical television receiver in which the baseband video signal is processed in an analog form, the chroma signal is separated from the luminance signal and applied to a chroma bandpass filter, or chroma peaker. The chroma peaker passes the chroma signal and exhibits a response chracteristic which corrects the signal for amplitude variations resulting from the television i.f. signal response characteristic, which tends to attenuate high frequency chroma signal components. The filtered chroma signal is then applied to a first chroma amplifier, which is coupled in a loop with a color killer and automatic chroma control circuit. The automatic chroma control circuit senses the amplitude of the chroma burst signal, and either kills the color signal if the burst amplitude is too low, or amplifies the chroma signal to a nominal level. The chroma signal is then applied to a second amplifier, which is responsive to the setting of a user color control. In RCA receivers of the Colortrak series, the user color control comprises two controls, identified as the saturation control and the PIX control, with the PIX control tracking the setting of the luminance contrast control. The chroma signal is further amplified or attenuated in accordance with the setting of these controls to produce a chroma signal suitable for color demodulation. This chroma signal is also applied to an overload detector, which senses the peak excursions of the chroma signal and reduces the chroma channel gain if the signal level is too great.

In a television receiver in which the baseband video signal is processed digitally, it is desirable to perform the above functions of an analog television receiver using entirely digital circuitry. A direct approach to a digital implementation of these functions would be to determine the required automatic chroma control gain, then multiply the chroma signal by this gain factor in a digital multiplier. The chroma signal could then be multiplied by a second gain factor, derived from the user color control, in a second digital multiplier, then attenuated if necessary by a third gain factor, produced by a digital overload detector, in a third digital multiplier.

The extensive use of multipliers in a digital television receiver is undesirable, however, because of their complexity and slow processing rate. Accordingly, it is desirable to provide chroma gain in a manner which is simple and provides high processing speed. Additionally, it is desirable to implement chroma gain control in conjunction with other digital filtering and demodulation processing so that signal resolution remains at an acceptable level without the introduction of excessive noise components into the chroma channel.

In accordance with the principles of the present invention, the gain of the chroma signal in a digital television receiver is controlled in accordance with the value of a composite gain factor which is an accumulation of gain control factors provided by a user color control, automatic chroma control, and chroma overload. Gain control according to the composite gain factor is realized by a coarse gain block, which increments or decrements the chroma signal gain in increments of six dB, and a fine gain block, which provides fine gain control over a range of six dB or less, in finely controlled increments. In a preferred embodiment, the digital chroma gain system is operated under control of a microprocessor, which receives signals representative of chroma overload, user control settings, and chroma burst amplitude. The microprocessor then calculates the composite chroma signal gain and apportions the gain between the coarse and fine gain control blocks. In the preferred embodiment of the present invention, the coarse gain block comprises controlled shift registers for controlling the chroma signal gain over a range of 18 dB in 6 dB increments. The fine gain block comprises an adder and a random access memory (RAM), addressed by the chroma signal, which contains a data table computed by the microprocessor.

In accordance with an aspect of the preferred embodiment of the present invention, the shift registers (hereinafter "shifters") which implement coarse gain are partitioned between the input and the output of the color demodulator, which provides acceptable signal levels for chroma demodulation and filtering without the introduction of excessive noise into the chroma channel.

Figure 1:
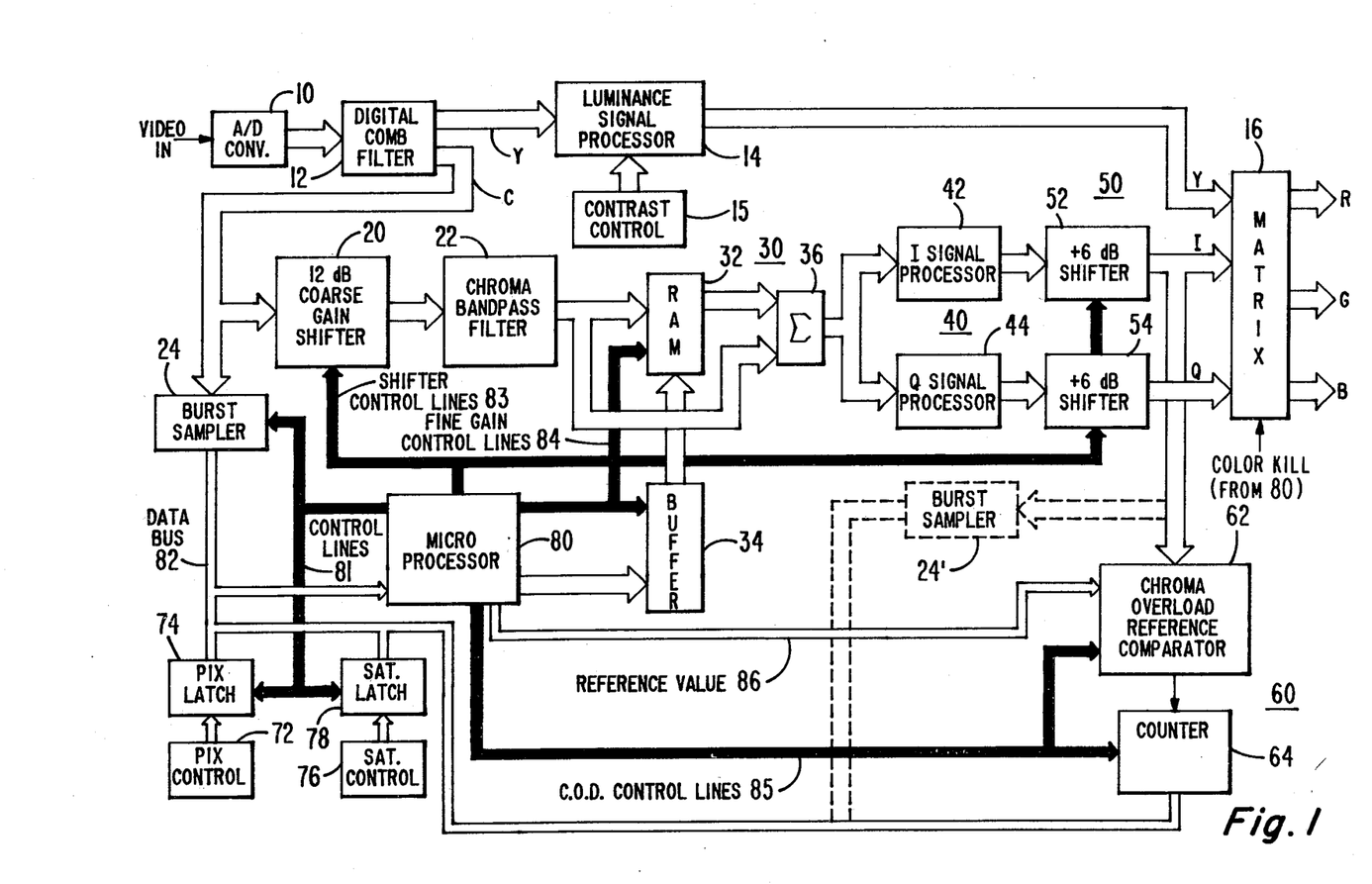
FIG. 1 illustrates, in block diagram form, the digital baseband video processing section of a television receiver constructed in accordance with the principles of the present invention.

Referring to FIG. 1, the video signal processing section of a digital television receiver is shown. A video input signal is applied to the input of an analog to digital (A/D) converter 10, which samples the video signal and converts it to digital signal samples. The digital signal samples are applied to a digital comb filter 12, which separates the signal into luminance (Y) signal components and chroma (C) signal components. The Y signal samples are applied to a luminance signal processor 14, which processes the Y signal in accordance with a contrast signal supplied by a contrast control 15. The processed Y signal is then applied to a matrix circuit 16.

The separated C signal is applied to a chroma gain control arrangement constructed in accordance with the principles of the present invention. The C signal is coupled to inputs of a burst sampler 24 and a 12 dB coarse gain shifter 20. The course gain shifter 20 comprises a controllable parallel shift register controlled by signals on shifter control lines 83. Because of its high speed and adaptability to integrated circuit fabrication, a barrel-type shifter such as described in the text *Introduction To VLSI Systems, by Mead and Conway*, published by Addison-Wesley (1980) is suitable for use as shifter 20. The controllable shifter may also be implemented with a multiplexer which selects different groups of bits of the digital chroma signal dependent upon the signals on control lines 83. The implementation of the controllable shift register using combinatorial logic, such as the barrel-type shifter or multiplexer, instead of a clocked device, is desirable for higher speed processing.

The coarse gain shifter 20 may be programmed to shift the chroma data words to the left (e.g., to more significant bit locations) by one bit location, two bit locations or none. The operation of the burst sampler 24 will be described subsequently. Chroma words produced at the output of the coarse gain shifter 20 are applied to the input of a chroma bandpass filter or peaker 22 which may comprise, for example, an FIR filter.

Chroma signals at the output of the chroma bandpass filter 22 are coupled to a fine gain block 30. The chroma signals are applied to address inputs of a RAM 32, and to one input of an adder 36. The output of the RAM 32 is coupled to a second input of the adder 36. Chroma signals at the output of the adder 36 are coupled to a color signal demodulator 40, including an I signal processor 42 and a Q signal processor 44. The I and Q signal processors may be constructed as described in United States patent application No.297,556, entitled "Digital Color Television Signal Demodulator", filed Aug. 31, 1981. Processed I and Q signals are coupled from the processors 42 and 44 to inputs of a further coarse gain shifter 50, including +6 dB shifters 52 and 54, which are controlled by signals on control lines 83. I and Q signals at the outputs of the +6 dB shifters 52 and 54 are coupled to inputs of the matrix circuit 16, which matrixes the Y, I and Q signals to produce red, green and blue color signals.

The I signal at the output of the +6 dB shifter 52 is also applied to the input of a chroma overload reference comparator 62 of a chroma overload detector 60. The comparator 62 compares the I signal level with a reference value supplied by data lines 86. When the I signal exceeds the reference value, a pulse is coupled to a counter 64, which counts the pulses over a given time interval. The output of the counter 64 is coupled to a data bus 82 which is coupled to an input of a microprocessor 80. Outputs of the burst sampler 24, a PIX latch 74, and a SAT latch 78 are also coupled to the data bus 82. A PIX control word, generated by a user PIX control 72, is applied to the input of the PIX latch 74, and a saturation control word, generated by a user saturation control 76, is applied to the input of the SAT latch 78. The microprocessor 80 controls the burst sampler 24, the PIX latch 74 and the SAT latch 78 by control words on control line 81. Microprocessor control words on fine gain control lines 84 control the loading of the RAM 32 of the fine gain block 30, and also control a buffer 34, which is used to store data for the RAM 32. The microprocessor also controls the chroma overload detector 60 through signals on COD control lines 85, and the coarse gain shifters by control lines 83.

The 12 dB coarse gain shifter 20 is capable of providing gains of one, two or four by shifting the chroma signal words to the left by zero, one, or two bit positions, respectively. Similarly, the +6 dB shifters 50 can provide gains of one or two by shifting the demodulated chroma signals to the left by zero or one bit position. These two shifters could be combined in a single 18 dB shifter in the place of either shifter 20 or shifters 50, for instance. However, if the shifters are combined and used in place of shifters 20 and 50, which implements the full gain of eight at the output of the demodulators 40, the chroma signal levels in the demodulators could be insufficient for the production of the desired resolution in the filtered and demodulated chroma signals. On the other hand, if the shifters are combined to implement a full gain of eight (three left shifts) at the input of the chroma channel, the input chroma signals would have the three least significant bit positions filled in with zeroes as the word is left-shifted. The three zero bits are unrelated to the actual chroma word value, and thus constitute low level noise in the signal. Thus, an excessively noisy signal will be filtered and demodulated in the chroma channel. In the embodiment of FIG. 1, a compromise is made of these conflicting effects of signal shifting by providing a maximum of two left shifts at the input of the chroma channel and a maximum of one at the output. The 12 dB shifter 20 provides sufficient signal levels for filtering and demodulation, while introducing a maximum of only two least significant bits (LSB's) of noise into the signal. The chroma signal is then filtered and demodulated by the chroma bandpass filter 22 and the demodulators 40 before the signal words can be shifted left a final time by the +6 dB shifters 50.

Figure 2:
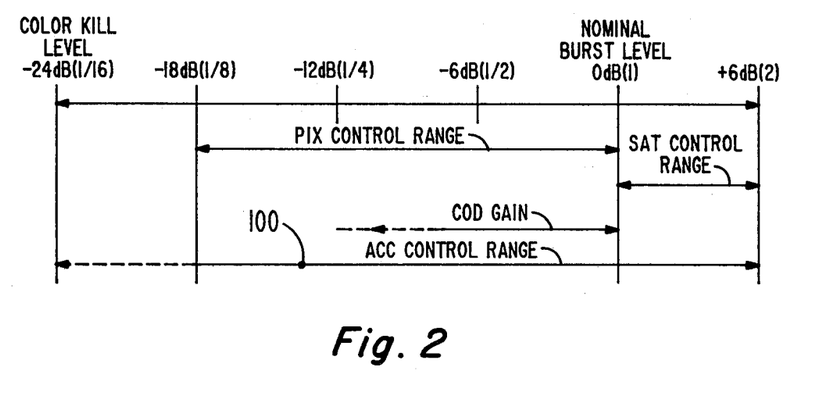
FIG. 2 illustrates the range of gain control of the chroma signal processing section of the arrangement of FIG. 1.

The range of chroma gain control of the arrangement of FIG. 1 is illustrated by FIG. 2. The color burst signal component of the chroma signal has a nominal peak-to-peak amplitude of 40 IRE units. A burst signal of this amplitude would not be amplified by the automatic chroma control (ACC) section of the chroma gain control system, and would cause the system to have 0 dB of gain, neglecting the effects of the user controls and the chroma overload detector 60. The ACC system will operate to amplify the chroma signal up to the nominal level of 40 IRE for burst as the signal amplitude declines by 18 dB, as indicated by the ACC control range line of FIG. 2. As the signal level decreases over a further range of 6 dB, as indicated by the broken portion of the ACC control range line, the ACC gain will amplify the chroma signal by 18 dB, but the signal level will not reach the burst reference level. If the burst signal level is down from the nominal level by 24 dB or more, the ACC system activates a color killer. The ACC gain control system is also capable of attenuating an excessively strong chroma signal by up to 6 dB.

The saturation control has a range of 6 dB, as indicated by the SAT control range line in FIG. 2. The saturation control signal can increase the chroma signal amplitude, which increases saturation, by up to 6 dB. In addition, the PIX control can attenuate the chroma signal by up to 18 dB, as shown by the PIX control range line in FIG. 2. The PIX and saturation controls may be arranged as a single control, if desired, with a range of chroma gain adjustment from +6 dB to −18 dB. However, these controls are shown as separate controls in FIGS. 1 and 2 to provide user gain control similar to that employed in an RCA Colortrak system, referred to above.

In addition, a chroma overload gain factor is derived from the chroma overload detector 60. For signals which do not exceed a reference level, the chroma overload gain, termed COD gain, has a nominal value of one (0 dB). As chroma overload increases, the COD gain value decreases to attenuate the signal, as shown by the COD gain line of FIG. 2.

Figure 3:
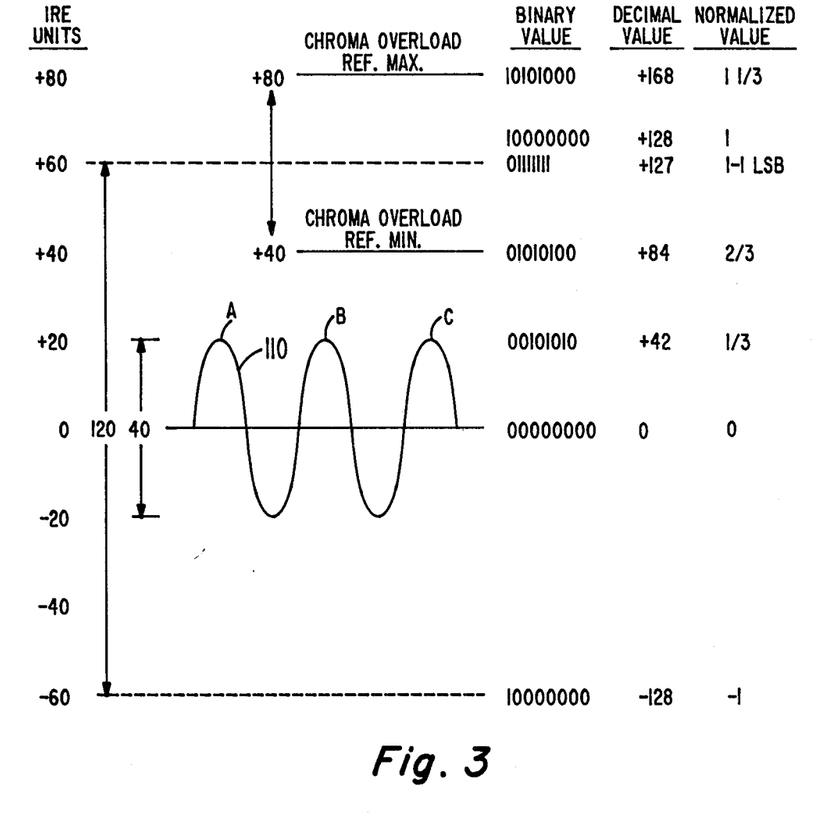
FIG. 3 illustrates a chroma burst waveform used to explain the operation of the chroma signal processing section of FIG. 1.

The burst sampler 24 operates to sense the level of the color burst signal component. Referring to FIG. 3, several cycles of a nominal burst signal 110 are shown. The nominal burst signal has a peak-to-peak amplitude of 40 IRE units. The digital comb filter 12 produces a chroma (C) signal comprised of digital samples in two's complement notation. In two's complement notation, these digital samples of the chroma signal will vary about the middle of the digital number system, which has a value of 00000000 for an eight-bit number system, or a decimal value of 0.

The dynamic range of the eight-bit number system extends from a value of 10000000 ($-128$) which corresponds to $-60$ IRE units, to a value of 01111111 ($+127$) which corresponds to $+60$ IRE units, as shown in FIG. 3. The burst sampler 24 samples the value of the burst signal at the signal peaks, as shown by sampling points, A, B and C. When the burst signal is at its nominal 40 IRE level, the burst peaks will be at the $+20$ IRE level, which corresponds to a normalized value of 42 $\frac{2}{3}$, or a digital value of approximately 00101011 ($+43$). The burst sampler may be controlled to sample the peaks of several cycles of the eight to eleven burst cycles per line. The sum of three of these samples for a 40 IRE burst signal should be 10000000 ($+128$), which corresponds to approximately 60 IRE. This is a normalized value of 1 in the embodiment of FIG. 1. Thus, for instance, the burst sampler 24 may be controlled to sample three burst signal peaks during each of 128 video lines. These sample values can then be summed and the sum divided by 128. The result of this calculation will be a normalized value of 1 for a nominal burst signal level. The ACC circuit will then act to adjust the gain of the system to correct for variations from this normalized value.

Figure 4:
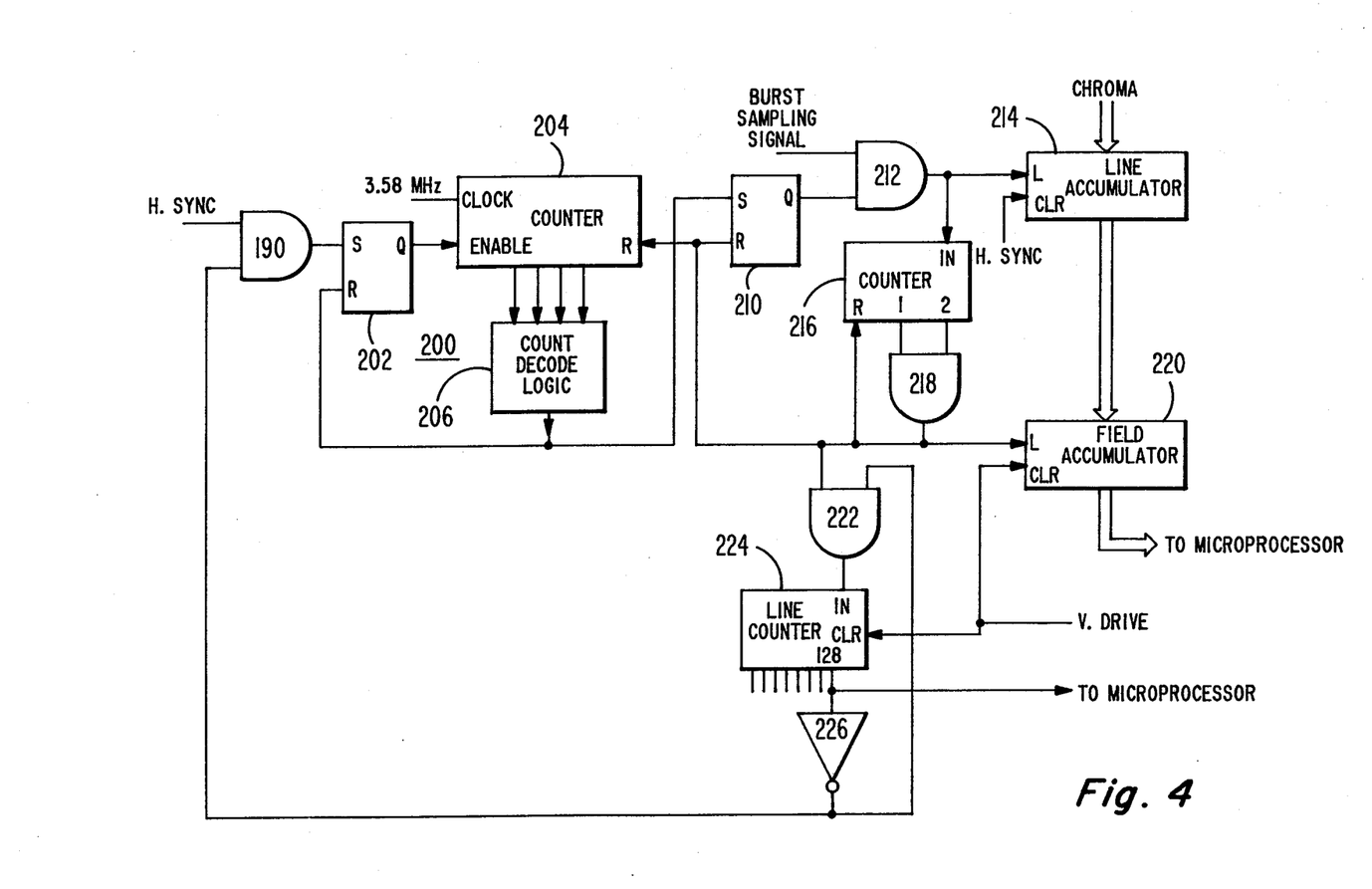
FIG. 4 illustrates the burst sampler of FIG. 1 in schematic detail.

The burst sampler 24 of FIG. 1 may be constructed as shown in FIG. 4. The vertical drive pulsed, produced by the deflection system (not shown) of the television receiver in the conventional manner, resets a line counter 224 and clears a field accumulator 220. With the line counter reset, its 128 output line produces a low signal, causing an inverter 226 to produce a high signal. In response to this signal, an AND gate 190 is enabled to pass the next horizontal synchronizing pulse produced by the deflection system. The trailing edge of the horizontal synchronizing pulse sets flip-flop 202 of a delay circuit 200, and also clears a line accumulator 214. When flip-flop 202 is set, a counter 204 is enabled, and begins to count cycles of a 3.58 MHz clock signal. When the counter 204 reaches a predetermined count, count decode logic 206 produces a pulse which resets flip-flop 202 and sets a flip-flop 210. The purpose of the delay circuit 200 is to delay the setting of flip-flop 210 relative to the horizontal sync pulse until the burst signal interval of the video signal is present at the input of the line accumulator 214.

When flip-flop 210 is set, it enables an AND gate 212, which applies pulses of a burst sampling signal to the load input L of the line accumulator 214. The burst sampling signal comprises a sequence of pulses which are aligned in phase with the 90° axis (R-Y axis) of the color burst signal. The 3.58 MHz signal for the counter 204 and the phase-aligned burst sampling signal may be developed in the television receiver as shown in FIG. 2 of U.S. patent application Ser. No. 297,556 now U.S. Pat. No. 4,415,918, entitled "DIGITAL COLOR TELEVISION SIGNAL DEMODULATOR" filed Aug. 31, 1981. The line accumulator comprises, for example, an adder and a storage register. In response to the burst sampling signal, the current value of the burst signal is summed with previous sample values and the new sum is stored in the storage register. The leading edge of each burst sampling signal pulse adds a new burst signal value to the previously stored values, and the trailing edge of the burst sampling signal pulse increments a counter 216.

The line accumulator totals the values of three burst signal peaks, shown as A, B, and C in FIG. 3. The trailing edge of the third burst sampling signal pulse increments the counter 216 to a count of three, which causes an AND gate 218 to produce a pulse at its output. This pulse resets flip-flop 210, which disables AND gate 212. The pule also resets counter 204, resets the counter 216, increments the line counter 224, and loads the contents of the line accumulator 214 into the field accumulator 220, which is constructed in a similar manner as the line accumulator.

The burst sampler continues to sample the burst signals on lines of the video signal in this manner. The sampled values are stored in the field accumulator 220 as the line counter is incremented over 128 lines. When the sampled values from the 128th sampled line have been loaded into the field accumulator, the pulse produced by the AND gate 218 increments the line counter to a count of 128, causing the output of inverter 226 to go low. This low signal disables AND gate 222 so that the line counter is held at a count of 128, and disables AND gate 190 from passing any more sync pulses. The high signal at the 128 output of the line counter 224 also informs the microprocessor that the field accumulator is holding samples from 128 lines. The microprocessor can then read the value stored in the field accumulator 220 and divide it by 128 to derive a value representative of the level of the burst signal. The next vertical drive signal will reset the line counter and clear the field accumulator in preparation for sampling the burst signals of the next video field.

The microprocessor 80 controls the chroma signal gain in the arrangement of FIG. 1 as follows. The microprocessor 80 first samples the value of the PIX control setting stored in the PIX latch 74, and the value of the saturation control setting stored in the SAT latch 78. The microprocessor computes the product of these two values to obtain a gain value called PIXSAT.

In the embodiment of FIG. 1, the PIX and SAT values are represented by a notation in which the most significant bit has a value of $2^1$, the next most significant bit has a value of $2^0$, and the remaining bits are descending powers of two ($2^{-1}$, $2^{-2}$, $2^{-3}$, etc.). For instance, the value of SAT can vary from a gain of one (1.0000000) to a gain of two (10.0000000), as indicated parenthetically in FIG. 2. Similarly, the value of PIX can vary from a gain of $\frac{1}{8}$ (0.0010000) to one. However, it is desirable to cause PIXSAT not to exceed one so that the composite gain factor calculated later will fall within certain limits. Thus, if PIXSAT is greater than one, its value is halved, and the halving is compensated by providing a gain of two (one left shift) in the $+6$ dB shifters 50. The final value of PIXSAT will therefore never exceed one.

The PIXSAT value is multiplied by a gain factor indicative of chroma overload, called COD GAIN, which is derived in response to signals provided by the chroma overload detector 60. The product of the PIXSAT and COD GAIN is called PREGAIN. Since COD GAIN has a maximum value of one, as shown in FIG. 2, and PIXSAT has previously been limited to a maximum permissible value of one, the PREGAIN value accordingly cannot exceed one.

The microprocessor 80 then obtains the burst average value BA, as described previously in conjunction with FIG. 3. The nominal BA value is one (1.0000000). If BA is greater than one, the chroma signal will be attenuated, up to a maximum of 6 dB (gain of ½). If BA is less than one, it will be amplified up to a maximum gain of 18 dB (gain of 8). Since BA is expressed in relation to a normalized value of one, the value of BA may be converted directly into a gain factor by inverting the value of BA, as described below. That is, if burst is down in amplitude by 6 dB, the value of BA will be one-half (0.1000000). A gain of two will then bring the chroma signal up to its desired level. If burst is down by 18 dB, the value of BA will be one-eighth (0.0010000), requiring a gain of eight.

The ACC gain factor is the product of both a coarse gain term, implemented by the 12 dB coarse gain shifter 20, and a fine gain term, implemented by the fine gain block 30. For example, assume that the BA value is 0.0011000, or 3/16. This corresponds to the chroma signal being approximately 14.5 dB below the desired level, as indicated by point 100 in FIG. 2. ACC GAIN is then calculated by shifting BA to the left until it is greater than one-half (0.1000000). Each left shift of BA corresponds to a 6 dB increase in gain. For each left shift of BA, the coarse gain shifter 20 is caused to shift the chroma signal to the left by one bit position. Therefore, if the BA value of 0.0011000 is left-shifted by two bit positions, the new BA value is 0.1100000, and the coarse gain shifter will be set to provide two left shifts of the chroma signal for a gain of 12 dB. The new normalized BA value is now ¾, which is greater than one-half (0.1000000). It is seen that if the new BA value is further increased by one-third of ¾, BA will have the desired nominal value of one. This is accomplished by inverting the BA value of ¾ to produce a fine ACC gain term of 4/3. This gain of 4/3, corresponding to a gain of 2.5 dB, is then implemented in the fine gain block 30, and 12 dB of gain is implemented in the coarse gain shifter 20, for a total ACC gain of 14.5 dB. The chroma signal is thereby amplified to its desired level.

It can be seen that, since BA is left-shifted until it is greater than one-half, the fine ACC gain term, which is the inverse of BA, is never greater than approximately two. The fine ACC gain term is then multiplied by the PREGAIN value, which has been previously limited to a maximum value of one, to produce a final gain product term GP, which accordingly cannot exceed two. Gains of up to approximately two (6 dB) are then implemented in the fine gain block 30.

The gain product term GP is used to calculate a table of data words which are loaded into the RAM 32. These data words are addressed by the chroma signal, then added to the chroma signal by the adder 36. The data words may be either positive or negative (two's complemented) fractional representation of the corresponding chroma signal address values. If they are positive, they are added to the chroma signal by the adder 36, and if they are two's complemented, subtraction is effected. Thus, the fine gain block 30 produces signals equal to the chroma signal plus or minus some fraction of the chroma signal. The fine gain block is therefore capable of doubling the chroma gain value, which provides a gain of two (6 dB).

Since the fine gain block 30 can have a maximum gain of two, the signals produced by the adder 36 must have one more bit than the applied chroma signals. This is readily accomplished by using a conventional adder with a carry-out bit for adder 36. Expressed mathematically, an N-bit chroma signal will require the use of a RAM capable of storing $2^N$ N-bit words, and the adder will be capable of producing N+1 bit words. A six-bit chroma signal, for instance, will require a RAM capable of storing 64 six-bit words, and the adder will produce seven-bit output signals.

From the foregoing, it is seen that the maximum chroma signal gain of the embodiment of FIG. 1 is 12 dB provided by the shifter 20, plus 6 dB provided by the shifters 50, plus up to 6 dB provided by the fine gain block 30, for a total of 24 dB. Referring to FIG. 2, it can be seen that this maximum gain would be provided when the burst amplitude is down by 18 dB, the PIX control is set for a gain of one (0 dB), the SAT control is set for a full 6 dB of gain, and there is no chroma overload (COD GAIN=1).

Figure 5:
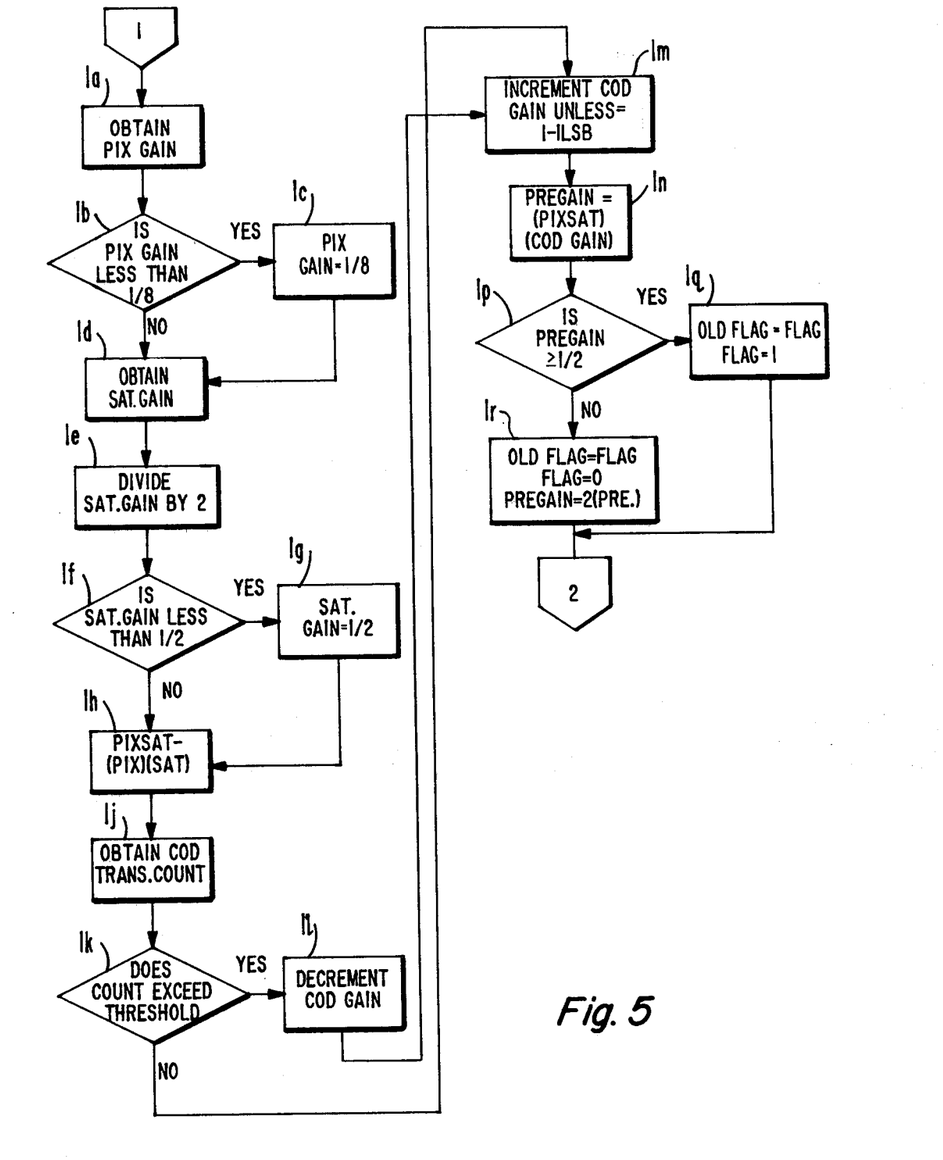
FIGS. 5–10 show flowcharts for a microprocessor for calculating and distributing the necessary chroma gain among the chroma gain control blocks of FIG. 1.

The above described operation of the embodiment of FIG. 1 may be implemented by programming the microprocessor 80 in accordance with the flowcharts of FIGS. 5–10. FIG. 5 is a flowchart of the first sequence in the microprocessor program, in which the term PREGAIN is generated and the gain of the +6 dB shifters 52 and 54 is determined. In step 1a, the microprocessor obtains the PIX GAIN value stored in PIX latch 74. The PIX GAIN value range is 1−1 LSB (0.11111111) to ⅛ (0.00100000). The expression of 1−1 LSB refers to a normalized value of one (1.00000000), less the value of a least significant bit of 1. The value of 1.00000000 is a nine bit word, and it is desirable to limit word lengths to eight bits. Thus, the value of one is reduced to the next lowest binary level of 0.11111111, which is eight bits in length and expressed in this discussion as 1−1 LSB. Similar notation is used throughout the flowchart to keep values within a desired word length.

In step 1b, PIX GAIN is checked to see if it is less than the minimum value of ⅛. If it is, PIX GAIN is forced to ⅛. If PIX GAIN is in range, the value of SAT GAIN is obtained from the SAT latch 78. Since SAT GAIN has a range of one to 2−2 LSB (1.11111101) the SAT GAIN range is divided by two in step 1e to bring the maximum range value below one. The halved range thus is one-half to 1−1 LSB. This division will later be accounted for when a term PREGAIN is calculated. SAT GAIN is then examined to see if the halved value is less than the minimum value of one-half. If it is, SAT GAIN gain is forced to one-half. The term PIXSAT is calculated by multiplying PIX GAIN by SAT GAIN.

In step 1j, the COD transition count is obtained from counter 64. This count is representative of the number of times that the chroma signal exceeded the reference level stored in the comparator 62 during a preceeding time interval. This count is compared with an internal threshold value, which is set to correspond to the time interval over which the COD transition count was made. If the count exceeds the threshold value, an internally stored COD GAIN term is decremented. If the count does not exceed the threshold, the COD GAIN term is incremented unless it is at its maximum value of 1−1 LSB. The COD gain term, which is the response of the system to chroma overload, is thus always less than one.

In step 1n, PIXSAT is multiplied by COD GAIN to yield the term PREGAIN. PREGAIN is then compared with one-half. If PREGAIN is greater than or equal to one-half, a term OLD FLAG is set equal to a term FLAG and FLAG is set to be one. When FLAG is one, the +6 dB gain shifters will shift the I and Q signals to the left by one bit position, which provides a +6 dB gain. When FLAG is zero, the +6 dB shifters do not shift the I and Q signals, which is the condition when PREGAIN is less than one-half. In the latter case, when PREGAIN is less than one-half, PREGAIN is doubled to produce the final PREGAIN value. Either the doubling of PREGAIN in step 1r or the setting of the +6 dB shifter FLAG in step 1q compensates for the halving of the SAT GAIN range in step 1e. The final PREGAIN value is always less than one. The program now exits the first sequence and enters the ACC gain sequence 2 in FIG. 6.

Figure 6:
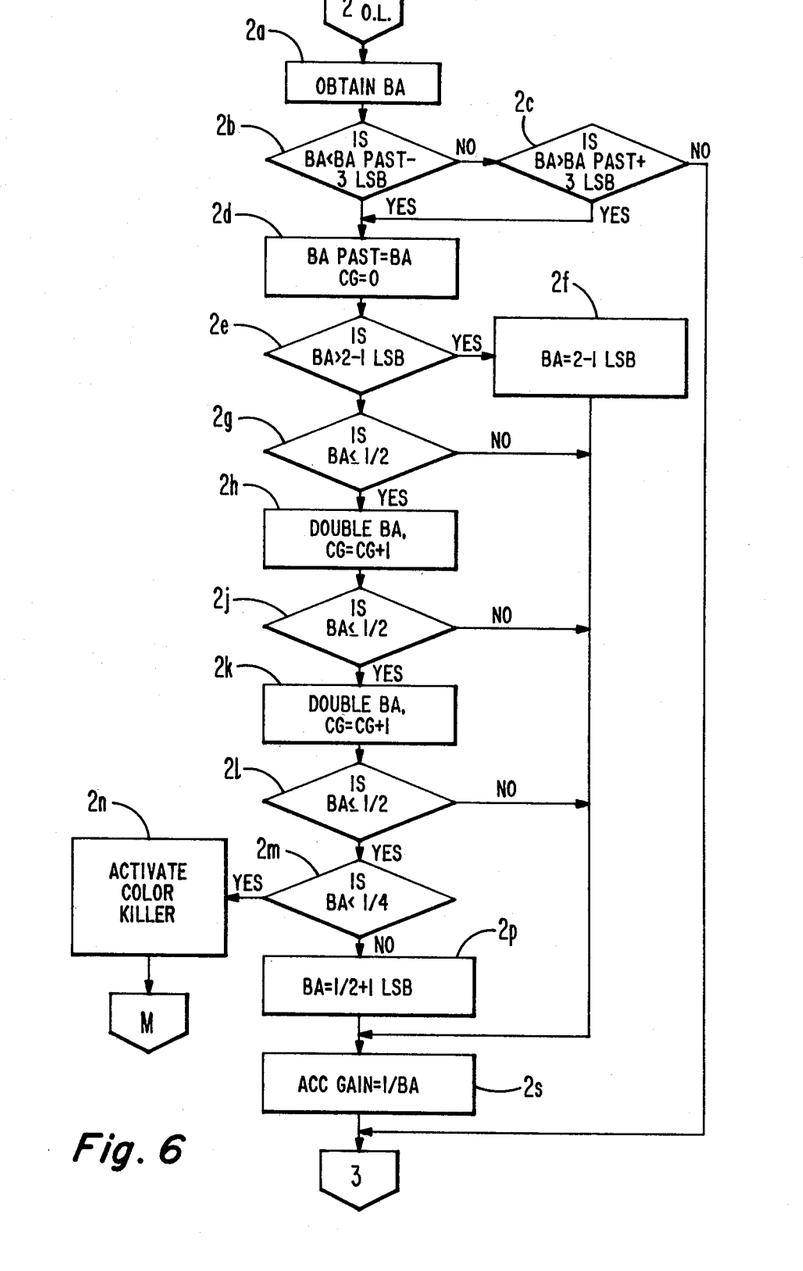

Sequence 2 in FIG. 6 is for an open loop burst sampling arrangement, in which burst is sampled before its level has been modified by the chroma gain control system. In step 2a, the burst average value BA is obtained from the burst sampler. BA has a nominal value of one, as described above. BA is first examined to see if it is less than the previously obtained value of BA, BA PAST less the value of three LSB's (0.00000011). If BA is not less than this value, BA is examined to see if it is greater than BA PAST plus the value of three LSB's. If it is not, the burst average has not changed appreciably from the last sampling interval, and ACC gain does not need to be recalculated. The existing value of ACC gain is left unchanged and the program exits the second sequence and goes to sequence 3. If BA has changed by more than the value of 3 LSB's, the program proceeds to step 2d, in which BA PAST is set equal to BA and a coarse gain indicator CG is set equal to zero.

In the next step 2e, BA is checked to see if it exceeds its maximum value of 2−1 LSB. If it does, BA is forced to 2−1 LSB. This value of BA will result in an ACC gain value of approximately one-half, which is the maximum attenuation to be imparted to the chroma signal by the ACC gain. If BA is less than the maximum value, it is checked to see if BA is less than or equal to one-half, in step 2g. If it is not, the program drops to step 2s. If BA is less than or equal to one-half, BA is doubled, and CG is incremented by one, which will cause the coarse gain shifter to provide 6 dB of gain, which offsets the doubling of BA. The new value of BA is again compared with one-half, and if it is not less than or equal to one-half, the sequence drops to step 2s. If BA is still less than or equal to one-half, BA is doubled again and CG is incremented by one, which will cause the coarse gain shifter to provide 12 dB of gain. The new BA value is again compared with one-half in step 21. If it is greater than one-half, the sequence drops to step 2s. If BA is less than or equal to one-half, BA is examined to see if it is less than one-quarter. If it is, the chroma signal is at least 24 dB below its nominal level, the color killer is activated, and the sequence exits to the main program M. If it is not less than one-quarter, BA is forced to a value of (½+1 LSB), which provides a maximum ACC gain of approximately 18 dB. Finally, a term ACC GAIN is generated by inverting BA in step 2s. The program then exits to sequence 3 in FIG. 7.

Figure 7:
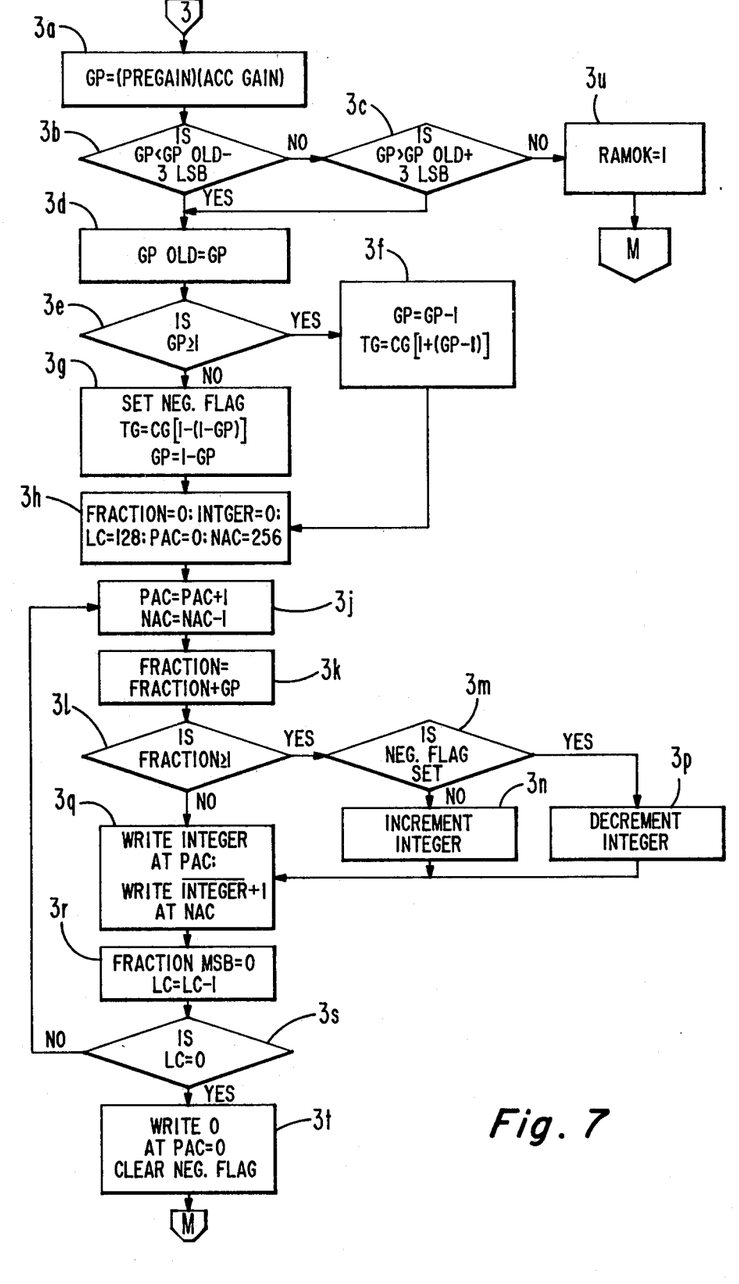

In sequence 3 of FIG. 7, the previously calculated values for PREGAIN and ACC GAIN are used to generate a table for the RAM 32.

In step 3a, a gain product term GP is calculated as the product of PREGAIN and ACC GAIN. GP will be in a range of zero to 2−1 LSB, or less than two. In step 3b, GP is checked to see if it is less than the previous value of GP, GP OLD, less the value of three LSB's. If it is not, GP is checked in step 3c to see if it is greater than GP OLD plus the value of three LSB's. If it is not, GP has not changed significantly from the previous generation of the RAM table and a new table does not have to be computed. A term, RAMOK, indicates this fact by being set to one and the sequence exits to the main program sequence M. If the value of GP has changed, GP OLD is set equal to GP and the sequence goes to step 3e.

In step 3e, GP is checked to see if it is greater than or equal to one. If it is, GP is set equal to (GP-1). The integer portion of the original GP value will then be provided by the direct coupling of the chroma signal to one input of adder 36, and the fractional portion will be provided by the output signal of the RAM 32. The sequence then goes to step 3h.

If GP is less than one, GP is set equal to (1−GP), a negative fractional number, and a NEGATIVE FLAG is set. In the fine gain block 30, the RAM will produce negative fractional values which, when summed with the directly coupled chroma signal in the adder 36, will produce chroma signals modified by a positive fractional gain factor. The sequence then goes to step 3h.

The following steps generate the RAM table for a 256-by-n bit RAM. Terms FRACTION and INTEGER are set equal to zero, loop counter LC is set equal to 128, a positive address counter PAC is set equal to zero, and a negative address counter NAC is set equal to 256. In the next step 3j, the PAC is incremented and the NAC is decremented by one. The term FRACTION is incremented by GP. The term FRACTION is then examined to see if it is one or more. If it is not, the value INTEGER is written at the PAC address of the buffer 34, and its two's complement, $\overline{\text{INTEGER}}$ +1, is written at the NAC buffer location. If FRACTION is greater than or equal to one, INTEGER is incremented by one if the NEGATIVE FLAG is not set, and is decremented by one if the NEGATIVE FLAG is set. The new value of INTEGER is then loaded into the buffer 34 at the PAC address location, and $\overline{\text{INTEGER}}$ +1 is loaded at the NAC buffer location. The most significant bit (MSB) of FRACTION is then zeroed, since this is the bit that indicates whether FRACTION is greater than or equal to one. The loop counter LC is decremented by one and checked to see if it is zero, indicating that the full table has been loaded. If LC is not zero, the sequence returns to step 3j; if it is zero, a value of zero is loaded into buffer address location zero, the NEGATIVE FLAG is cleared, and the program goes to the main program M.

It may be seen that the above sequence loads the buffer 34 in ascending and descending order from the center value of zero of the two's complement number system. For example, if GP is equal to 0.67, FRACTION will be equal to 0.67 during the first loop through the program. INTEGER values of zero will be written at buffer address locations 1 and −1 during this first loop. During the second loop, FRACTION is incremented by 0.67 to produce a new value of 1.34. If the NEGATIVE FLAG is not set, an INTEGER value of 1 is loaded into buffer address location 2, and an $\overline{\text{INTEGER}}$ +1 value of −1 is loaded into buffer address location −2. FRACTION is then truncated to 0.34. During the third loop, FRACTION is incremented by 0.67 to 1.01. INTEGER is then incremented to 2 and loaded into buffer address location 3 and an $\overline{\text{INTEGER}}$ +1 value of −2 is loaded into buffer address location −3. FRACTION is then truncated to 0.01. During the fourth loop, FRACTION is incremented to 0.68 and INTEGER is not changed. An INTEGER value of 2 is loaded into buffer address location 4, and an $\overline{\text{INTEGER}}$ +1 value of −2 is loaded into buffer address location −4. The sequence continues in this manner until all buffer locations have been loaded, ending with a value of zero being loaded into buffer address location zero.

Figure 8:
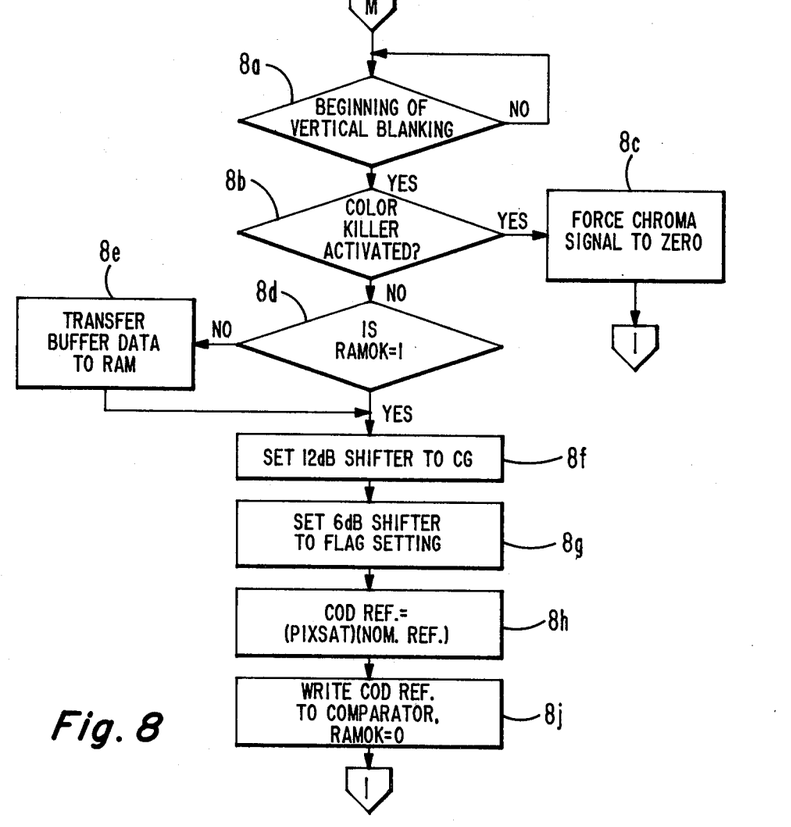
Figure 9:
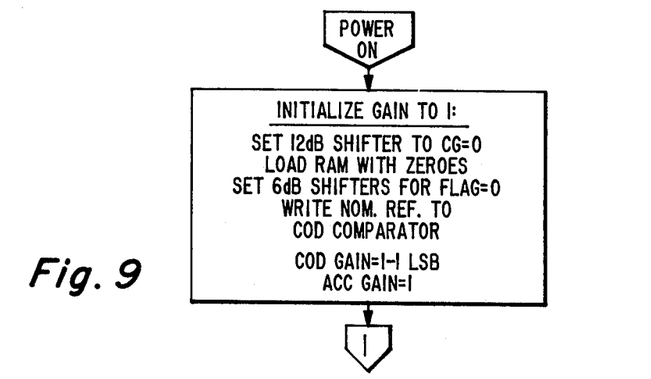

With the buffer fully loaded, the main program shown in FIG. 8 is executed to adjust the gain of the system. The main program first checks to see if the video signal has reached the vertical blanking interval, as indicated, for instance, by a vertical blanking pulse. It is desirable to change the system gain only during the vertical blanking interval so as not to disturb the viewing of the television image. Once the vertical blanking interval has begun, the program checks to see of the color killer has been activated in step 2n. If it has, the chroma signal is forced to zero in step 8c and the program goes to sequence 1. In this open loop ACC type system, chroma may be forced to zero at any point in the signal path following the takeoff point for the burst sampler 24. If color is not to be killed, the program checks in step 8d to see if RAMOK is equal to one. If it is, the RAM 32 does not have to be reloaded, and the sequence goes to step 8f. If RAMOK is not equal to one, the data in the buffer is transferred to the RAM 32. After the RAM 32 has been loaded with the new data table, the 12 dB coarse gain shifter 20 is set for the number of shifts indicated by the value of CG: none for CG=0, one for CG=1, and two for CG=2. In the next step, the +6 dB shifters 50 are set to provide a left shift if FLAG=1, and no shifts if FLAG=0. Then a new COD reference value is calculated by multiplying PIX-SAT by the nominal reference value, shown as +40 IRE in FIG. 4. This prevents the chroma overload detector from opposing an increase in saturation caused by the user saturation control. In step 8j, the COD refrence value is transferred to the chroma overload reference comparator 62, and RAMOK is set equal to zero. The system is once again ready to process the chroma signal, and the program returns to sequence 1.

It may be desirable to connect the burst sampler 24 in a closed loop configuration, as shown by the connection of the burst sampler 24' at the output of the +6 dB shifter 52. This connection may be advantageous in that a high level burst signal is produced at this point, which may be sampled to produce a phase adjustment signal for the sampling signal of the A/D converter 10, for instance. With the burst sampler 24' connected at the output of the chroma gain control system, the open loop ACC sequence of FIG. 6 may be modified as shown by the closed loop sequence of FIG. 10. In addition, the color killer must force the chroma signal to zero at a point following the takeoff point for the burst sampler 24', in the matrix 16, for instance, as shown in FIG. 1.

Figure 10:
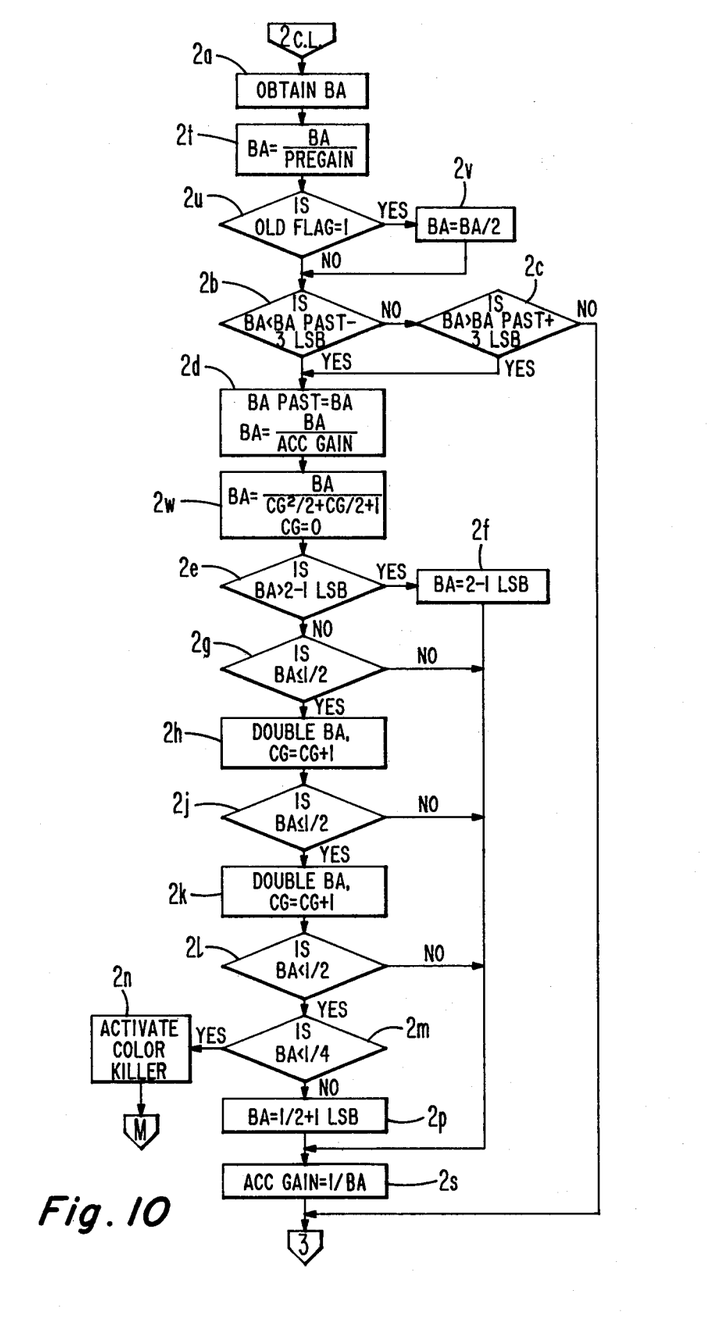

In FIG. 10, the burst average value BA is obtained in step 2a. The BA value in the closed loop case contains all of the gain factors of the chroma gain system, since BA is derived from the output of the system. In the next step 2t, BA is divided by the value of PREGAIN to remove this gain factor. Next, the value of OLD FLAG is checked to see if the burst signal was increased by 6 dB by the +6 dB shifter 52. If it was, BA is divided by two in step 2v. The burst signal value BA now is a product of the burst signal at the system input and the ACC gain factor.

In the following steps 2b and 2c, the BA value is checked to see if it is within three bits of the nominal value of 1 for the product of burst and ACC gain. If it is, the program drops to sequence 3. If the value of BA is substantially different from the nominal value, BA PAST is set equal to BA, and BA is divided by the term ACC GAIN in step 2d, thereby removing all gain factors from the BA value except for the coarse gain shifter gain. In the next step 2w, BA is divided by the function $(CG^2/2)+(CG/2)+1$ to remove the coarse gain shifter gain from BA. All system gain has thus been remove from BA, which now permits the ACC gain to be calculated with succeeding steps 2e through 2s, as described in the open loop system of FIG. 6.

When the burst sampler 24 is coupled in the open loop configuration, no initialization of the system hardware is generally required at start-up, because the burst signal sample is not processed by the system. However, when the burst sampler 24' is coupled in a closed loop configuration, some initialization is necessary. This may be accomplished by the power on initialization sequence of FIG. 9, which sets the system gain to one when the television receiver is turned on. In this sequence, CG is set to zero and correspondingly sets the 12 dB coarse gain shifter 20 for no shifts, which is unity gain. The RAM is loaded with all zeroes, causing the fine gain block 30 to have unity gain. The +6 dB shifters 52 and 54 are set for no shifts, which provides unity gain. The nominal reference value is applied to the COD comparator 60, and the internal COD gain is set to 1−1 LSB. Finally, ACC GAIN is set to one. The closed loop system is now ready to compute a correct value for chroma gain.

The fine gain block 30 of FIG. 1 may be modified by using the RAM 32 alone to provide up to 6 dB of gain, which eliminates the need for adder 36. Since the dynamic range of the RAM must therefore be doubled from zero to a gain of one to zero to a gain of two, the value of each RAM location must be increased by adding the respective address value of each RAM location to the value of INTEGER when calculating the respective values for the RAM table in sequence 3. The use of the RAM alone for the fine gain block has the disadvantage of halving the dynamic range of the fine gain block 30 when the same size RAM is used. The dynamic range can only be maintained by doubling the size of the RAM. The use of fine gain block 30 of FIG. 1 is advantageous in that the adder 36 can produce N+1-bit words when N-bit words are applied to the input of the fine gain block. In addition, the use of the adder 36 in the fine gain block provides improved least significant bit accuracy in the event it is desired to have the capacity of the RAM 32, since the exact value of the chroma signal is added to the RAM output signal by the adder. In such an arrangement, LSB accuracy would be reduced by the use of the smaller RAM, but a half-LSB of accuracy would be regained by adding the exact value of the chroma signal to the RAM output signal.

What is claimed is:

1. In a television receiver, including a source of digital color information signals having a burst signal component, and a source of color control signals representing a level of amplification or attenuation to be applied to said digital color information signals, a chroma signal gain control system comprising:

means, responsive to said digital color informations signals, for producing a signal indicative of the level of said burst signal component;

a chroma overload detector, having an input responsive to said digital color information signals for detecting signal levels in excess of a predetermined threshold to produce a chroma overload signal indicative thereof;

calculating means, responsive to said burst level indication signal, said chroma overload signal and said color control signals, for calculating the total gain required to be applied to said digital color information signals and for producing gain control signals representative of said total gain; and controlled digital chroma gain circuitry having an input coupled to receive said digital color information signals and an output at which digital color information signals modified by a gain factor are produced, said circuitry including a controllable signal shifter having a control input coupled to said calculating means and responsive to said gain control signals for adjusting the gain applied to said color information signals in increments which are multiples of 6 dB, and a fine gain block, coupled in series with said signal shifter and having a control input coupled to said calculating means and responsive to said gain control signals for adjusting the gain applied to said color information signals in increments over a range of up to approximately 6 dB, wherein said calculating means apportions said total gain between said signal shifter and said fine gain block so as to modify the level of said color information signals in accordance with said total gain requirement.

2. In a television receiver, including a source of digital color information signals, a digital chroma signal gain control system comprising:

shift register means having an input coupled to receive said digital color information signals, and an output, for shifting the respective bit locations of said digital color information signals so as to amplify or attenuate said digital color information signals in increments which are multiples of 6 dB; and fine gain means having an input coupled to the output of said shift register, and an output, for amplifying or attenuating said digital color information signals by a gain factor which is equal to or less than 6 dB, said fine gain means comprising:

a random access memory having an address input coupled to receive said color information signals from said shift register means, an output, and containing data words representative of the product of said color information signals and a gain factor; and an adder having a first input coupled to the output of said random access memory, a second input coupled to receive said color information signals from said shift register means, and an output at which digital color information signals modified by a gain factor are produced.

3. In a television receiver, including a source of digital color information signals, a digital chroma gain control system comprising:

a controllable signal shifter having an input coupled to receive said digital color information signals, and an output, and responsive to a first gain control signal for controlling the gain applied to said digital color information signals over a range of gain factors in increments which are multiples of two;

a controllable fine gain block, having an input coupled to the output of said controllable signal shifter, and an output at which digital color information signals modified by a gain factor are produced, and responsive to a second gain control signal for controlling the gain applied to said digital color information signals over a range of gain factors of two or less in increments which are less than two, said controllable fine gain block comprising:

a random access memory having an address input coupled to receive said color information signals from said controller signal shifter, an output, and containing data words representative of the product of said color information signals and a gain factor; and an adder having a first input coupled to the output of said random access memory, a second input coupled to receive said color information signals from said controller signal shifter, and an output at which digital color information signals modified by a gain factor are produced; and gain control means, responsive to the level of said digital color information signals, for producing said first and second gain control signals.

4. In a television receiver, including a source of digital color information signals having a burst signal component, and a source of color control signals representing a level of amplification or attenuation to be applied to said digital color information signals, a chroma signal gain control system comprising:

means, responsive to said digital color information signals, for producing a signal indicative of the level of said burst signal component;

calculating means, responsive to said burst level indicating signal and said color control signals, for calculating the total gain required to be applied to said digital color information signals and for producing gain control signals representative of said total gain; and controlled digital chroma gain circuitry having an input coupled to receive said digital color information signals and an output at which digital color information signals modified by a gain factor are produced, said circuitry including a controllable signal shifter having a control input coupled to said calculating means and responsive to said gain control signals for adjusting the gain applied to said color information signals in increments which are multiples of 6 dB, and a fine gain block, coupled in series with said signal shifter and having a control input coupled to said calculating means and responsive to said gain control signals for adjusting the gain applied to said color information signals in increments over a range of up to approximately 6 dB, wherein said fine gain block comprises:

a random access memory having an address input coupled to receive said color information signals from said coarse gain block, an output, and containing data words representative of the product of said color information signals and a gain factor; and an adder having a first input coupled to the output of said random access memory, a second input coupled to receive said color information signals from said signal shifter, and an output at which said digital color information signals modified by a gain factor are produced; and wherein said calculating means apportions said total gain between said signal shifter and said fine gain block so as to modify the level of said color information signals in accordance with said total gain requirement.

5. The arrangement of claim 1 or 4, wherein said calculating means comprises a microprocessor, and wherein said source of color control signals comprises a user saturation control.

6. In a television receiver, including a source of digital color information signals, a digital chroma gain control system having an input to which said color information signals are applied and having an output at which digital color information signals modified by a gain factor are produced, comprising:
- a controllable coarse gain block responsive to a first gain control signal for controlling the gain applied to said digital color information signals over a range of gain factors in multiples of a coarse increment;
- a controllable fine gain block, coupled in series with said coarse gain block, and responsive to a second gain control signal for controlling the gain applied to said digital color information signals over a range of gain factors up to approximately said coarse increment in fine increments which are substantially smaller than said coarse increment, said controllable fine gain block comprising:
- a random access memory having an address input coupled to receive color information signals from said coarse gain block, an output, and containing data words representative of the product of said color information signals and a gain factor; and
- an adder having a first input coupled to the output of said random access memory, a second input coupled to receive said color information signals from said coarse gain block, and an output at which digital color information signals modified by a gain factor are produced; and
- gain control means, responsive to the level of said digital color information signals, for producing said first and second gain control signals.

7. In a television receiver, including a source of digital color information signals, a digital chroma gain control system comprising:
- controlled digital chroma gain circuitry having an input coupled to receive said digital color information signals, and an output at which first gain controlled digital color information signals are produced, said circuitry including first controlled shift register means responsive to a first gain control signal, for selectively varying the gain applied to said color information signals in increments which are multiples of 6 dB;
- a digital color signal demodulator, having an input coupled to the output of said controlled digital chroma gain circuitry and an output at which digital color difference signals are produced; and
- second controlled shift register means having an input coupled to the output of said demodulator and responsive to a second gain control signal for selectively varying the gain applied to signals processed by said demodulator in increments which are multiples of 6 dB.

8. The arrangement of claim 7, wherein said controlled digital chroma gain circuitry further includes a fine gain block, coupled in cascade with said first controlled shift register, responsive to a third gain control signal, and capable of varying the gain applied to said color information signals in increments less than 6 dB; and further comprising
- gain control signal generating means, responsive to the level of said digital color information signals, for producing said first, second and third gain control signals.

9. In a television receiver, including apparatus for determining the amplitude of the digitized color burst signal component of a digitized chroma signal relative to a desired signal level, a method for controlling the gain applied to said digitized chroma signal so as to cause said signal to attain a desired signal level comprising the steps of:
- (a) sensing the amplitude value of said digitized color burst signal relative to said desired level, wherein said desired level has a normalized value of one;
- (b) successively multiplying said amplitude value by two until the resultant value is one-half or greater; and, for each multiplication;
- (c) shifting the respective bits of said digitized chroma signal to respective bit positions which are one higher in order than the present bit positions to produce a resultant digitized chroma signal;
- (d) inverting said resultant value to produce a gain factor; and
- (e) multiplying one of said chroma signal or said resultant chroma signal by said gain factor.

10. The method of claim 9, further including a step following step (a) which comprises:
- (f) when said amplitude value is greater than one, proceeding to step (d) and using said amplitude value as said resultant value.

11. The method of claim 10, further including a step preceding step (f) which comprises:
- (g) when said amplitude value is greater than two, proceeding to step (d) and using two as said resultant value.

12. In a television receiver, including a random access memory having an address input and an output, a method for controlling the level of a digitized chroma signal comprising the steps of:
- (a) deriving a gain factor of two or less by which the level of said digitized chroma signal is to be modified, and if said gain factor is one or greater proceeding to step (b) and if said given factor is less than one proceeding to step (c);
- (b) subtracting one from said gain factor to produce a RAM gain factor and proceeding to step (d);
- (c) subtracting said gain factor from one to produce a RAM gain factor and proceeding to step (d);
- (d) successively adding said RAM gain factor to an initial value of zero to produce a table of values, each value having an integer component and a fractional component;
- (e) storing said integer components of said values in consecutive memory locations of said random access memory above an address location of zero;
- (f) storing the complement of said integer components of said values in consecutive memory locations of said random access memory below said address location of zero;
- (g) addressing said random access memory with said digitized chroma signal; and
- (h) summing the signals produced at the output of said random access memory with said digitized chroma signal to produce a resultant digital signal representative of said digitized chroma signal modified by a gain factor of two or less.

13. The arrangement of claim 2 further comprising filter means, interposed between the output of said shift register means and the input of said fine gain means, for bandpass filtering said amplified or attenuated digital color information signals from said shift register means.

14. The arrangement of claim 3 further comprising filter means, interposed between the output of said controllable signal shifter and the input of said controllable fine gain block, for bandpass filtering said gain-controlled digital color information signals from said controllable signal shifter.

15. In a television receiver, including a source of digital color information signals having a burst signal component, and a source of color control signals representing a level of amplification or attenuation to be applied to said digital color information signals, a chroma signal gain control system comprising:

means, responsive to said digital color information signals, for producing a signal indicative of the level of said burst signal component;

calculating means, responsive to said burst level indicating signal and said color control signals, for calculating the total gain required to be applied to said digital color information signals and for producing gain control signals representative of said total gain; and controlled digital chroma gain circuitry having an input coupled to receive said digital color information signals and an output at which digital color information signals modified by a gain factor are produced, said circuitry including a controllable coarse gain block having a control input coupled to said calculating means and responsive to said gain control signals for adjusting the gain applied to said color information signals in multiples of a coarse increment, and a controllable fine gain block, coupled in series with said course gain block and having a control input coupled to said calculating means and responsive to said gain control signals for adjusting the gain applied to said color information signals in fine increments over a range of up to approximately said coarse increment in fine increments which are substantially smaller than said coarse increment, said controllable fine gain block comprising:

a random access memory having an address input coupled to receive color information signals from said coarse gain block, an output, and containing data words representative of the product of said color information signals and a gain factor; and an adder having a first input coupled to the output of said random access memory, a second input coupled to receive said color information signals from said coarse gain block, and an output at which said digital color information signals modified by a gain factor are produced; and wherein said calculating means apportions said total gain between said coarse gain block and said fine gain block so as to modify the level of said color information signals in accordance with said total gain requirement.

* * * * *